United States Patent

Bakhti et al.

[11] Patent Number: 5,887,094
[45] Date of Patent: Mar. 23, 1999

[54] BAND-PASS FILTER IN AN OPTICAL WAVEGUIDE

[75] Inventors: Fatima Bakhti; Isabelle Riant; Pierre Sansonetti, all of Palaiseau, France

[73] Assignee: Alcatel Alsthom Compagnie Generale d'Electricite, Paris, France

[21] Appl. No.: 921,323

[22] Filed: Aug. 29, 1997

[30] Foreign Application Priority Data

Sep. 2, 1996 [FR] France .................................. 96 10680

[51] Int. Cl.[6] ...................................................... G02B 6/26
[52] U.S. Cl. ................................ 385/28; 385/27; 385/37
[58] Field of Search ................................. 385/27, 28, 29, 385/30, 37, 14, 129, 130

[56] References Cited

U.S. PATENT DOCUMENTS

| | | | |
|---|---|---|---|
| 4,153,328 | 5/1979 | Wang | 385/28 X |
| 5,104,209 | 4/1992 | Hill et al. | 385/27 |
| 5,133,028 | 7/1992 | Okayama et al. | 385/11 |
| 5,475,780 | 12/1995 | Mizrahi | 385/37 |
| 5,499,256 | 3/1996 | Bischel et al. | 372/28 |
| 5,513,196 | 4/1996 | Bischel et al. | 372/22 |
| 5,570,440 | 10/1996 | Mizrahi | 385/37 |
| 5,641,956 | 6/1997 | Vengsarkar et al. | 250/227.14 |
| 5,740,292 | 4/1998 | Strasser | 385/37 |

OTHER PUBLICATIONS

A. M. Vengsarkar et al, "Long–Period Fiber Gratings As Band–Rejection Filters", *Journal of Lightwave Technology*, vol. 14, No. 1, 1 Jan. 1996, pp. 58–65.

J. Canning et al, "pi–phase–shifted periodic distributed structures in optical fibres by UV post–processing", *Electronics Letters*, 4 Aug., 1994, UK, vol. 30, No. 16, ISSN 0013–5194, pp. 1344–1345.

R. C. Alferness et al, "Narrowband Grating Resonator Filters in INGAASP/INP Waveguides", *Applied Physics Letters*, vol. 49, No. 3, 1 Jul. 1986, pp. 125–127.

*Primary Examiner*—Brian Healy
*Attorney, Agent, or Firm*—Sughrue, Mion, Zinn, Macpeak & Seas, PLLC

[57] ABSTRACT

A band-pass filter written into an optical waveguide includes at least one Bragg grating creating coupling between two propagation modes. In one version the pitch of the grating is equal to the length of beating of these two modes, to create codirectional coupling for the LP01 and LP0i modes. In another version the grating couples the LP01 mode to any contradirectional radiation mode. The filter includes, at one point at least of the grating, an area in which one half-period of the grating is omitted to create a phase-shift of π between the two coupled modes.

8 Claims, 3 Drawing Sheets

BAND-PASS FILTER IN AN OPTICAL WAVEGUIDE

BACKGROUND OF THE INVENTION

1. Field of the Invention

The invention concerns a band-pass filter written in an optical waveguide, which can be an optical fiber, a guide integrated into a semiconductor optical component or into the silica.

2. Description of the Prior Art

The formation of a filter in a waveguide is known in the prior art and consists in writing a Bragg grating into the guide. The prior art proposes various techniques for writing a grating of this kind into an optical fiber as disclosed in patents U.S. Pat. No. 4,474,427, U.S. Pat. No. 4,725,110, U.S. Pat. No. 5,104,209 and U.S. Pat. No. 5,367,588. Each technique is based on localized modification of the refractive index obtained by exposing the core of a fiber, typically doped with germanium, to spatially modulated ultraviolet light. An optical filter using a Bragg grating of this kind has a reflection spectrum with a peak centered on a wavelength called the Bragg wavelength. In transmission, a filter of this kind has a rejection band corresponding to the reflection peak.

The article "Long-period fiber gratings as band-rejection filters" by A. M. VENGSARKAR et al., published in OFC'95, PD4 (1995), describes a band-rejection optical filter in the form of a long-pitch Bragg grating (the pitch is in the order of one hundred $\mu$m) written in an optical fiber from which the coating is locally removed. The pitch of the grating is chosen so that the fundamental mode guided in the core of the fiber is coupled at a given wavelength to a cladding mode which is then rapidly attenuated as it propagates in the cladding, because of losses at the cladding-coating interface.

French patent application n° 95 14434 describes a band-pass optical filter written into a waveguide that has three Bragg grating portions and two intermediate areas. Each portion has a Bragg wavelength equal to the pass-band wavelength $\lambda$p. The Bragg grating has a short pitch that produces contradirectional coupling between the go mode and the return mode of the fundamental mode. Each intermediate area creates a phase-shift of $\pi$ between these two propagation modes.

In some applications this filter does not procure a sufficiently wide rejection band on either side of the pass-band. Further, it has the drawback of necessitating an optical isolator on its upstream side to block propagation of the contradirectional mode.

French patent application n° 96 02620 describes a band-pass filter formed by writing at least two long-pitch Bragg gratings into an optical fiber. The optical fiber is tapered to define two substantially adiabatic transition areas delimiting an intermediate area. A first long pitch Bragg grating is written in the intermediate area. A second long pitch Bragg grating is written in the transition area on the side receiving an optical signal. The effective index of the fiber in this area decreases along this transition area. The presence of the second grating in this area leads to coupling between the LP01 and LP02 modes over a large bandwidth and this results in rejection over a large bandwidth. The first grating produces codirectional coupling between the LP01 and LP02 modes at a wavelength which is a function of the pitch of the first grating. It produces an LP01 mode signal that conveys the power of the incoming optical signal for the wavelengths of coupling between the two modes by this first grating and an LP02 mode signal that is attenuated by leakage at the cladding-coating interface. This results in rejection over a very wide band, except for the band defined by the first grating. The combination of the two gratings therefore constitutes a band-pass filter.

The fabrication of this prior art filter has the drawback of necessitating the writing of two gratings instead of one.

The aim of the invention is to propose a band-pass filter that does not have the drawbacks of the prior art filters.

SUMMARY OF THE INVENTION

In a first aspect the invention consists in a band-pass filter written in an optical waveguide, including at least one Bragg grating creating coupling between two propagation modes in the guide, wherein, to create codirectional coupling between the LP01 propagation mode and an LP0i propagation mode, where i is any integer, the grating has a pitch equal to the length of beating of the two modes, and including, at one point at least of the grating, means for creating a phase-shift of $\pi$ between the two modes.

In a second aspect the invention consists in a band-pass filter written in an optical waveguide, including at least one Bragg grating creating coupling between two propagation modes in the guide, wherein, to create contradirectional coupling between the LP01 propagation mode and any radiation mode, the grating is offset angularly relative to an axis of the guide and its pitch is in the order of 0.5 micron, and including, at one point at least of the grating, means for creating a phase-shift of $\pi$ between the two modes.

The above filters have the advantage of not reflecting anything and therefore of not necessitating any optical isolator on their upstream side.

In a preferred embodiment the waveguide is a monomode fiber and the coupling occurs between the fundamental mode and the cladding mode or a radiation mode.

The invention will be better understood and other features will become apparent from the following description and the accompanying drawings.

DETAILED DESCRIPTION OF THE PREFERRED EMBODIMENTS

The first embodiment has only one Bragg grating BG1. The grating BG1 is written into an optical fiber by a standard method, for example. It has a phase-shift or phase skip area PS1 situated at or near its center. This phase-shift area PS1 is made by a method known in itself consisting either in uniform illumination of this area or in spatially skipping one half-period of the grating when the fiber is exposed to ultraviolet light to write the grating.

The pitch s of the grating BG1 is chosen to create codirectional coupling between a core propagation mode and a cladding propagation mode, which two modes can be the LP01 and LP02 modes, respectively. The phase-shift area PS1 creates a phase-shift of π between these two modes, so providing a resonator opening a pass-band in a rejection band that is wider than the pass-band. The cladding mode is dissipated at the interface between the cladding and the coating of the fiber. There is no reflection of any signal in the upstream direction and there is therefore no need to provide an optical isolator.

To obtain this coupling, the pitch s is made equal to the length of beating of these two modes for the required wavelength at the center of the pass-band of the filter. The pitch is then "long" in the sense that it is in the order of several hundred microns for a Bragg wavelength in the order of one micron. The manual "OPTICAL WAVEGUIDE THEORY" by Allan W. SNYDER and John D. LOVE, Chapman and Hall, New York, page 257, shows that the coupling by a grating is maximal when the pitch is equal to the length of beating between these two modes.

The value of the index variation to be obtained when writing the grating is fixed and then simulations are carried out to determine the transmission graph for different values of the length of the grating. The length producing the required pass-band and an attenuation in the rejected band at least equal to that required is chosen.

Figure 1:
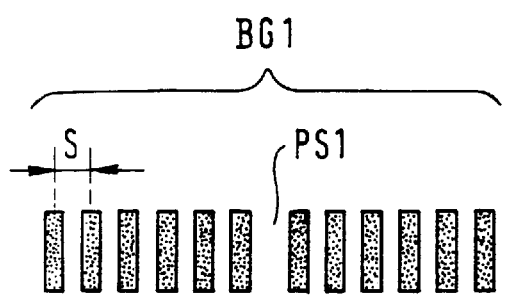
FIG. 1 shows a first embodiment of a filter in accordance with the invention.
Figure 2:
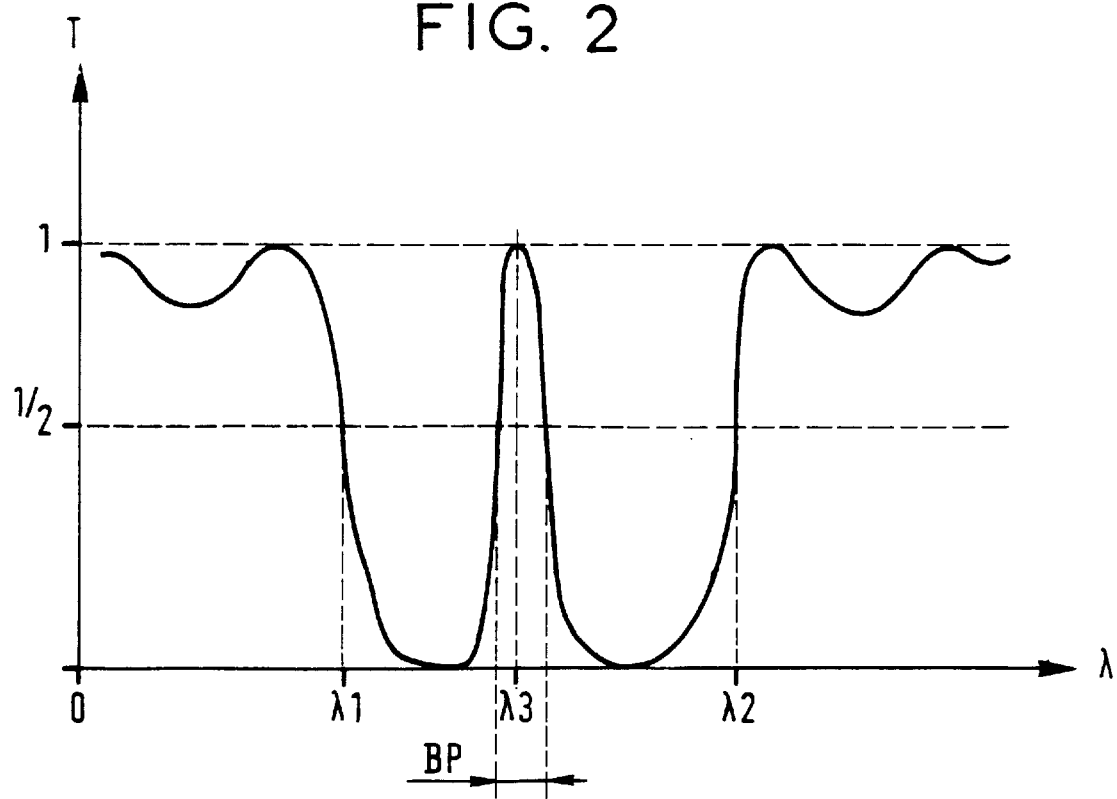
FIG. 2 shows the transmission graph of this first embodiment of a filter in accordance with the invention.

FIG. 2 is a graph of the transmission T as a function of the wavelength λ for one example of a filter in accordance with FIG. 1. The pass-bands are defined for a (power) transmission equal to ½. The transmission has a peak centered on the wavelength λ3 which is the Bragg wavelength chosen for the grating BG1, with a pass-band width BP. The filter strongly attenuates all other wavelengths in a band λ1–λ2 much wider than the pass-band BP and approximately centered on λ3.

Figure 3:
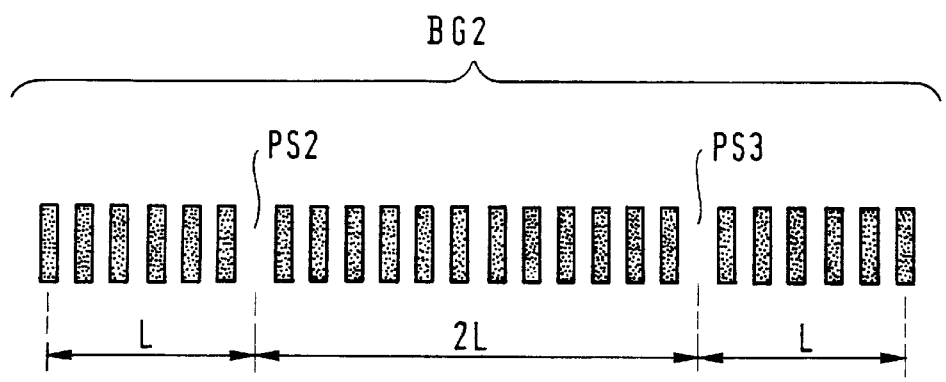
FIG. 3 shows a second embodiment of a filter in accordance with the invention.

FIG. 3 shows a second embodiment having a single Bragg grating BG2 in which two phase-shift areas PS2 and PS3 have been formed (phase-shift π). In this example they are distributed such that if 4L is the total length of the grating the area PS2 is at a distance L from one end of the grating and the area PS3 is at a distance 3L from this same end. Other configurations can be simulated to choose one that procures a shape of the transmission graph close to the required shape.

Figure 4:
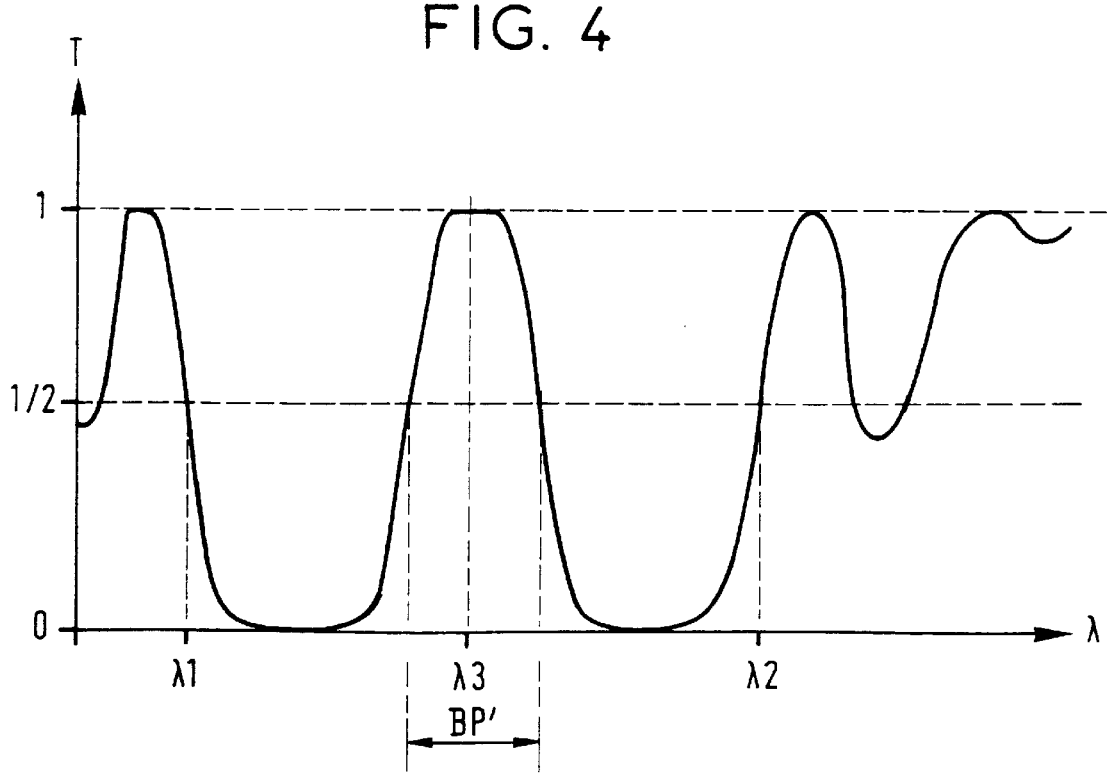
FIG. 4 shows the transmission graph of the second embodiment of a filter in accordance with the invention.

FIG. 4 shows the transmission graph for this example. It shows a pass-band BP' around the wavelength λ3 which is wider than the pass-band BP of the graph for the first example.

Figure 5:
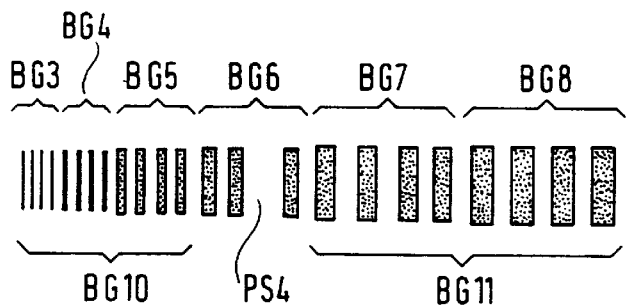
FIG. 5 shows a third embodiment of a filter in accordance with the invention.

FIG. 5 is a schematic representation of a third embodiment having a plurality of Bragg gratings:

a central grating BG6 which is similar to the grating BG1 previously described, i.e. having a phase-shift area PS4; and two Bragg gratings BG10 and BG11, of varying pitch, on either side of the grating BG7, along the waveguide.

In this example the gratings with varying pitch are each made up of a plurality of consecutive gratings of fixed pitch, respectively:

BG3, BG4, BG5;

BG7, BG8.

The pitches of these gratings are similar and increase continuously in the order of the gratings BG3, ..., BG8. The gratings BG3, BG4, BG5 each create a rejection band that adjoins the rejection band of the grating BG6 and which widens the latter on the shorter wavelength side. The gratings BG7 and BG8 each create a rejection band adjoining the rejection band of the grating BG6 and which widens the latter on the longer wavelength side.

Figure 6:
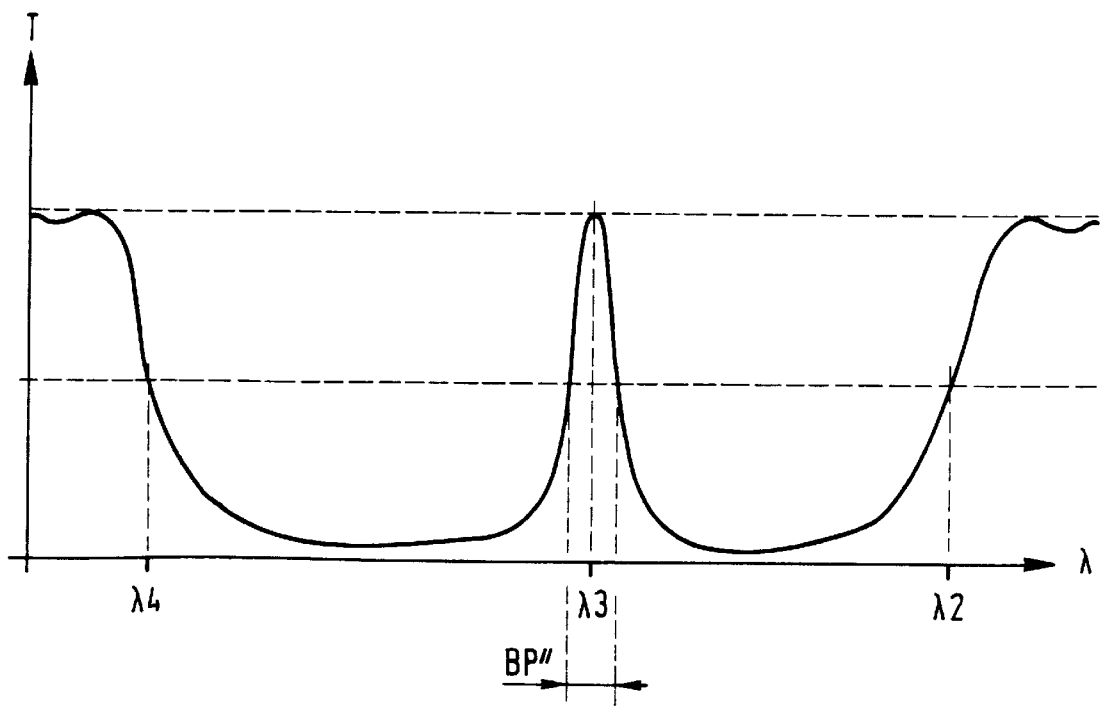
FIG. 6 shows the transmission graph of the third embodiment of a filter in accordance with the invention.

FIG. 6 shows the transmission graph for this embodiment. The pass-band BP'' about a wavelength λ3 is practically the same as if there were only the grating BG6. In contrast, the rejection band λ4–λ5 is much wider than if there were only the grating BG6.

This third embodiment could also be implemented with gratings BG10 and BG11 with pitches varying continuously.

In one embodiment a grating like those described above is etched in a tapered length of monomode fiber. The calculation of the pitch of the grating must then allow for the rate of reduction of the fiber diameter as this rate influences the effective index of the fiber. In a device of this kind, the coupling between the coupled modes is higher, which results in higher attenuation in the rejection band.

In a variant of the above embodiments, the grating is offset angularly relative to the axis of the fiber. The pitch s of the grating is then in the order of 0.5 micron, to obtain contradirectional coupling between a guided mode and a radiation mode. In this variant no signal is reflected upstream.

In another variant, a Bragg grating, is used to create codirectional coupling as in the example described above, but consisting of components that are inclined at a constant angle to a plane normal to the propagation axis. A grating of this kind couples the fundamental mode with the higher order symmetry radiation modes. It behaves like a rejection filter. This angle modifies the shape of the transmission graph. The angle is chosen by means of simulations.

The Bragg gratings and the phase-shift areas constituting the filter in accordance with the invention can be written using one of the methods known in themselves described in the documents cited in the introduction.

There is claimed:

1. A band-pass filter written in an optical waveguide, including at least one Bragg grating creating coupling between two propagation modes in said guide, wherein, to create codirectional coupling between the LP01 propagation mode and an LP0i propagation mode, where i is any integer, said grating has a pitch equal to the length of beating of said two modes, and including, at one point at least of said grating, means for creating a phase-shift of π between said two modes.

2. The filter claimed in claim 1 wherein said guide is a monomode optical fiber having a tapered part and said grating is written in said tapered part of said fiber.

3. A band-pass filter written in an optical waveguide, including at least one Bragg grating creating coupling between two propagation modes in said guide, wherein, to create contradirectional coupling between the LP01 propagation mode and any radiation mode, said grating is offset angularly relative to an axis of said guide and its pitch is in the order of 0.5 micron, and including, at one point at least of said grating, means for creating a phase-shift of π between said two modes.

4. The filter claimed in claim 1 wherein said waveguide is a monomode fiber and said coupling occurs between the fundamental mode and a cladding mode or a radiation mode.

5. The filter claimed in wherein each of said means for creating a phase-shift of π consists in the absence of one half-period of said grating.

6. The filter claimed in claim 1 further including at least a second Bragg grating having a pitch slightly different from that of said first grating to reject wavelengths neighboring those rejected by said first grating.

7. The filter claimed in claim 6 wherein said second grating is a Bragg grating with a pitch that varies discretely, consisting of a plurality of gratings each of which has a constant pitch different to the pitch of the others.

8. The filter claimed in claim 6 wherein said second grating is a Bragg grating with a pitch varying continuously.

* * * * *